(12) United States Patent
Shinohara et al.

(10) Patent No.: US 12,583,186 B2
(45) Date of Patent: Mar. 24, 2026

(54) ULTRASONIC BONDING METHOD, ULTRASONIC BONDING APPARATUS, AND ULTRASONIC BONDING SYSTEM

(71) Applicant: Kabushiki Kaisha Toshiba, Tokyo (JP)

(72) Inventors: Yuto Shinohara, Yokohama Kanagawa (JP); Takahiro Aizawa, Yokohama Kanagawa (JP); Takashi Ito, Fujisawa Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 11 days.

(21) Appl. No.: 18/437,184

(22) Filed: Feb. 8, 2024

(65) Prior Publication Data

US 2024/0326345 A1 Oct. 3, 2024

(30) Foreign Application Priority Data

Mar. 27, 2023 (JP) ................................. 2023-049785

(51) Int. Cl.
  B32B 41/00 (2006.01)
  B29C 65/00 (2006.01)
  B29C 65/08 (2006.01)

(52) U.S. Cl.
  CPC .......... B29C 65/08 (2013.01); B29C 66/9515 (2013.01)

(58) Field of Classification Search
  CPC ..... B29C 65/08; B29C 66/9515; B23K 20/26; B23K 31/125; B23K 20/10; H01M 50/563; H01M 50/54
  USPC .................... 156/60, 64, 350, 351, 378, 379
  See application file for complete search history.

(56) References Cited

U.S. PATENT DOCUMENTS

| | | |
|---|---|---|
| 2020/0035642 A1 | 1/2020 | Egusa et al. |
| 2022/0105693 A1 | 4/2022 | Aizawa et al. |

FOREIGN PATENT DOCUMENTS

| | | |
|---|---|---|
| JP | 2004-058523 A | 2/2004 |
| JP | 2004-158583 A | 6/2004 |
| JP | 2012-035299 A | 2/2012 |
| JP | 2013-255927 A | 12/2013 |
| JP | 2022-061631 A | 4/2022 |
| WO | 2018/143410 A1 | 11/2019 |

*Primary Examiner* — Michael N Orlando
*Assistant Examiner* — Joshel Rivera
(74) *Attorney, Agent, or Firm* — Kim & Stewart LLP

(57) ABSTRACT

According to one embodiment, an ultrasonic bonding method for bonding a plurality of bonding members together by applying pressure and an ultrasonic wave includes a pressing step of applying pressure to one bonding member and another bonding member so as to press against each other, an application step of applying an ultrasonic wave to the one bonding member, a detection step of detecting a vibration state of another bonding member during the application step, and a step of determining a state of bonding between the bonding members based on the vibration state acquired in the detection step.

15 Claims, 8 Drawing Sheets

FIG. 4

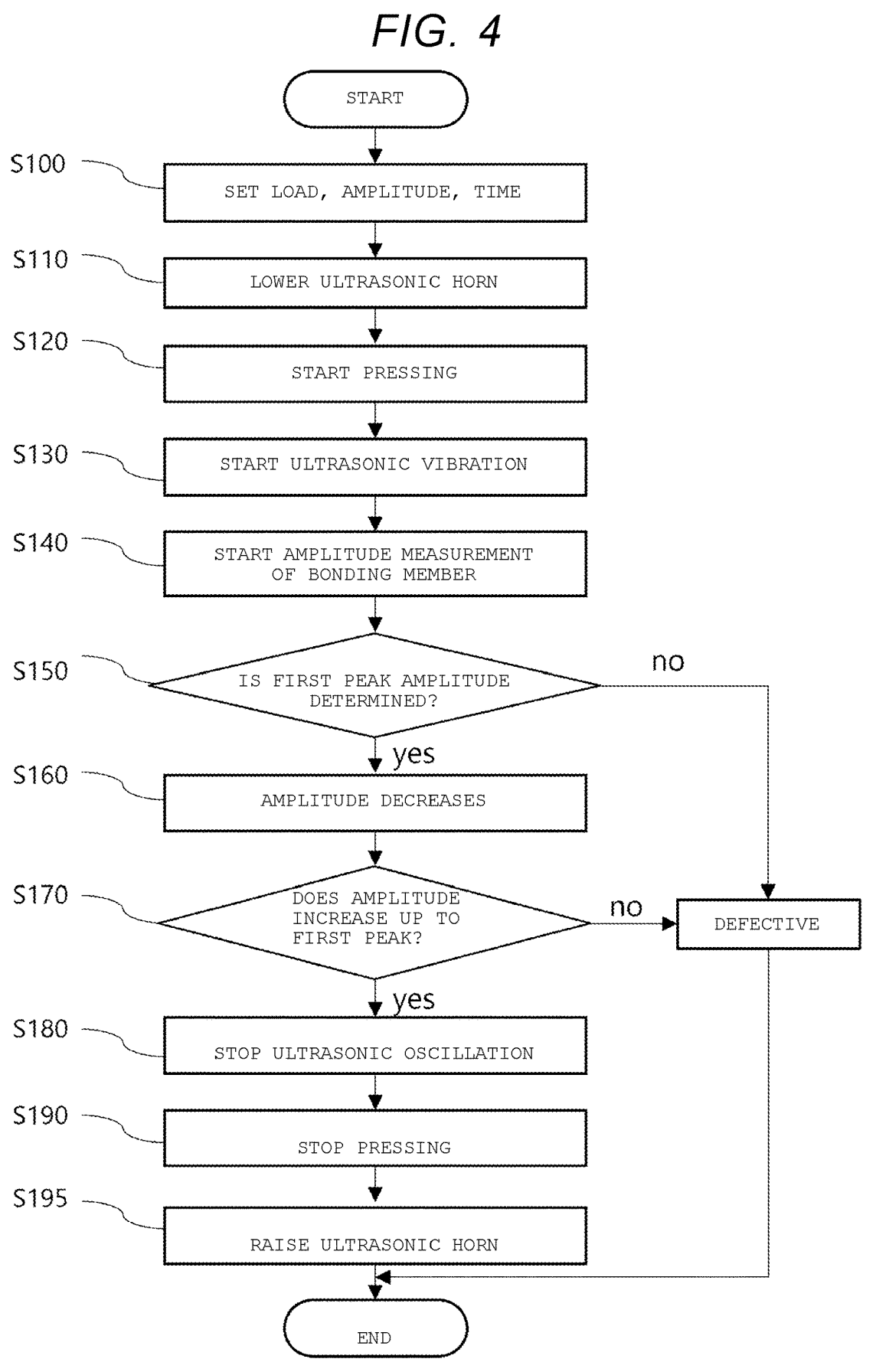

```
                          ( START )
                              │
                              ▼
S100 ──────  ┌─────────────────────────────────┐
             │   SET LOAD, AMPLITUDE, TIME      │
             └─────────────────────────────────┘
                              │
                              ▼
S110 ──────  ┌─────────────────────────────────┐
             │      LOWER ULTRASONIC HORN       │
             └─────────────────────────────────┘
                              │
                              ▼
S120 ──────  ┌─────────────────────────────────┐
             │         START PRESSING           │
             └─────────────────────────────────┘
                              │
                              ▼
S130 ──────  ┌─────────────────────────────────┐
             │     START ULTRASONIC VIBRATION   │
             └─────────────────────────────────┘
                              │
                              ▼
S140 ──────  ┌─────────────────────────────────┐
             │    START AMPLITUDE MEASUREMENT   │
             │       OF BONDING MEMBER          │
             └─────────────────────────────────┘
                              │
                              ▼
S150 ──────       ◇ IS FIRST PEAK AMPLITUDE ◇ ──── no ──┐
                  ◇    DETERMINED?          ◇           │
                              │                         │
                            yes                         │
                              ▼                         │
S160 ──────  ┌─────────────────────────────────┐        │
             │       AMPLITUDE DECREASES        │        │
             └─────────────────────────────────┘        │
                              │                         │
                              ▼                         │
S170 ──────       ◇ DOES AMPLITUDE      ◇               │
                  ◇ INCREASE UP TO       ◇ ── no ──┐    │
                  ◇ FIRST PEAK?          ◇         │    │
                              │                    ▼    ▼
                            yes            ┌──────────────────┐
                              ▼            │    DEFECTIVE      │
S180 ──────  ┌──────────────────────────┐ └──────────────────┘
             │ STOP ULTRASONIC OSCILLATION│         │
             └──────────────────────────┘          │
                              │                     │
                              ▼                     │
S190 ──────  ┌─────────────────────────────────┐   │
             │         STOP PRESSING            │   │
             └─────────────────────────────────┘   │
                              │                     │
                              ▼                     │
S195 ──────  ┌─────────────────────────────────┐   │
             │      RAISE ULTRASONIC HORN       │   │
             └─────────────────────────────────┘   │
                              │                     │
                              ▼◄────────────────────┘
                           ( END )
```

ULTRASONIC BONDING METHOD, ULTRASONIC BONDING APPARATUS, AND ULTRASONIC BONDING SYSTEM

CROSS-REFERENCE TO RELATED APPLICATION

This application is based upon and claims the benefit of priority from Japanese Patent Application No. 2023-049785, filed Mar. 27, 2023, the entire contents of which are incorporated herein by reference.

FIELD

Embodiments described herein relate generally to an ultrasonic bonding method, an ultrasonic bonding apparatus, and an ultrasonic bonding system.

BACKGROUND

An ultrasonic bonding apparatus is known which uses a bonding tool to apply pressure and an ultrasonic wave to bonding members placed on a stage, and bond the bonding members together. The ultrasonic bonding apparatus controls the time for applying the ultrasonic wave, the amplitude of the applied ultrasonic wave, and the like, based on a bonding state, such as a bonding strength and a fracture mode of the bonding members bonded together. The bonding strength between the bonding members bonded together can be estimated by measuring vibration, heat, sound, and the like, near a bonding portion by using an external sensor each time ultrasonic bonding is performed.

Meanwhile, since the fracture mode is determined by performing a tensile test after bonding members are bonded together, it is difficult to specify fracture modes of all the bonding members that had been ultrasonically bonded. For this reason, an ultrasonic bonding apparatus is required which can determine fracture modes of all bonding members that are ultrasonically bonded and control the ultrasonic bonding according to the fracture modes.

DESCRIPTION OF THE DRAWINGS

FIG. 4 is a flowchart illustrating an ultrasonic bonding method according to a first embodiment.

DETAILED DESCRIPTION

Embodiments provide an ultrasonic bonding apparatus that can determine a bonding state of bonding members at the time of bonding while ultrasonic bonding is performed and control the ultrasonic bonding according to the bonding state.

In general, according to one embodiment, an ultrasonic bonding method for bonding a plurality of bonding members together by applying pressure and an ultrasonic wave includes a pressing step of applying pressure to one bonding member and another bonding member to press against each other, an application step of applying an ultrasonic wave to the one bonding member, a detection step of detecting a vibration state of another bonding member during the application step, and a step of determining a state of bonding between the bonding members based on the vibration state acquired in the detection step.

Hereinafter, an ultrasonic bonding method, an ultrasonic bonding apparatus, and an ultrasonic bonding system according to embodiments will be described with reference to the drawings. In the present specification, basically, a vertically upward direction is defined as an upward direction, and a vertically downward direction is defined as a downward direction.

First Embodiment

An ultrasonic bonding apparatus and an ultrasonic bonding method according to a first embodiment are described with reference to FIGS. 1 to 6.

Figure 1:
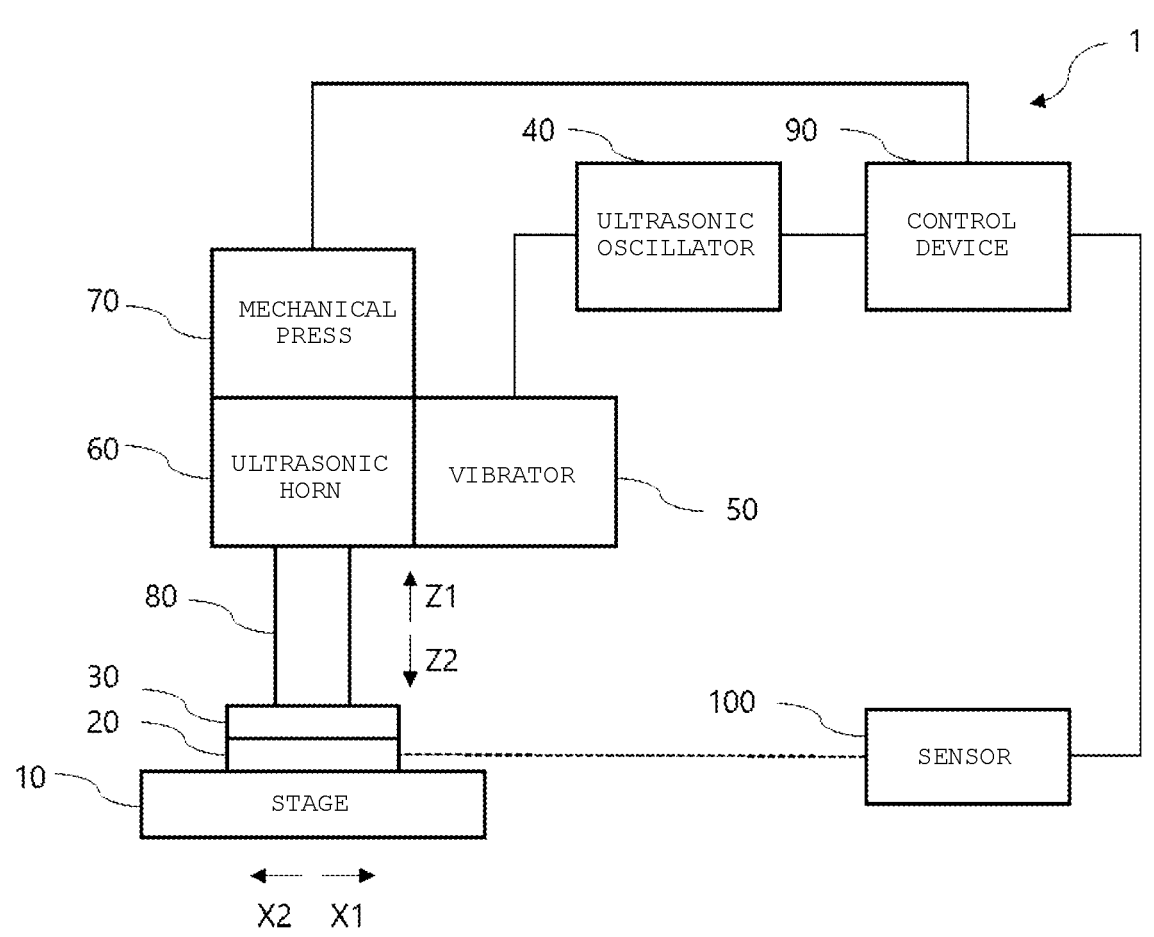
FIG. 1 is a schematic diagram illustrating an example of an ultrasonic bonding apparatus according to a first embodiment.

First, the ultrasonic bonding apparatus is described. FIG. 1 is a schematic diagram illustrating an example of the ultrasonic bonding apparatus according to the first embodiment. As illustrated in FIG. 1, in an ultrasonic bonding apparatus 1, a height direction indicated by arrows Z1 and Z2 and a plane direction, which is indicated by arrows X1 and X2, perpendicularly intersecting the height direction are defined. The height direction coincides with a vertical direction.

Figure 2:
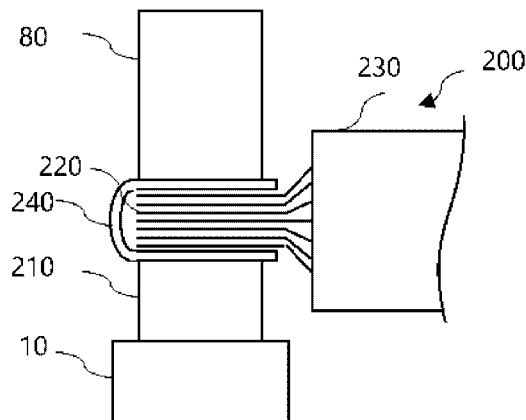
FIG. 2 is a schematic diagram illustrating an example of bonding members ultrasonically bonded together by the ultrasonic bonding apparatus according to the first embodiment.

The ultrasonic bonding apparatus 1 applies pressure and ultrasonic waves to a first bonding member 20 and a second bonding member 30 placed on a stage 10, thereby bonding the first bonding member 20 to the second bonding member 30. Although FIG. 1 illustrates two bonding members, this is only an example, and the number of bonding members is not limited to two, and a plurality of members may be bonded together. In addition, when the first bonding member 20 and the second bonding member 30 are bonded together by using the ultrasonic bonding apparatus 1, the first bonding member 20 and the second bonding member 30 are placed on the stage 10 in a state where at least the portions to be bonded overlap each other. The first bonding member 20 and the second bonding member 30 may be made of the same material or different materials. For example, as illustrated in FIG. 2, in a manufacturing process of a battery 200, the ultrasonic bonding apparatus 1 is used to bond a lead 210 connected to, for example, a positive terminal of the battery 200 after bundling a current-collecting tab 220, which bundles end portions of a coil 230 wound around an electrode, with a clip plate 240. Specifically, the lead 210 is placed on the stage 10, the current-collecting tab 220 bundled with the clip plate 240 is put thereon, ultrasonic waves from a bonding tool 80 is transmitted to the clip plate 240, the current-collecting tab 220, and the lead 210, and the clip plate 240 is pressed against the lead 210 by pressure of a mechanical press 70. Here, the first bonding member 20 is the lead 210, and the second bonding member 30 is the clip plate 240 in which the current-collecting tab 220 is bundled.

The ultrasonic bonding apparatus 1 includes an ultrasonic wave generator configured to apply ultrasonic waves to the second bonding member 30. The ultrasonic wave generator includes an ultrasonic oscillator 40 to which a voltage oscillated from an oscillation circuit is supplied, and a vibrator 50 that converts an electrical signal transmitted from the ultrasonic oscillator 40 into vibration to generate ultrasonic waves. The ultrasonic bonding apparatus 1 further includes an ultrasonic horn 60 that transmits the load from the mechanical press 70 and the ultrasonic waves generated by the vibrator 50 to the bonding tool 80, the mechanical press 70 that generates the pressure applied to the first bonding member 20 and the second bonding member 30, the bonding tool 80 that transmits the load and the ultrasonic waves from the ultrasonic horn 60 to the second bonding member 30, a control device 90 that controls the ultrasonic oscillator 40 and the mechanical press 70, and a sensor 100 that detects vibration of the first bonding member 20.

The stage 10 supports the first bonding member 20 and the second bonding member 30 from below in a height direction.

The ultrasonic oscillator 40 includes an oscillation circuit. The ultrasonic oscillator 40 converts an input electrical signal into an electrical signal of a high frequency (for example, 20 kHz) and a high voltage (for example, approximately 1000 V), and transmits the converted electrical signal to the vibrator 50.

The vibrator 50 converts the electrical signal transmitted from the ultrasonic oscillator 40 into vibration to generate ultrasonic waves. The vibrator 50 transmits the generated ultrasonic waves to the ultrasonic horn 60.

The ultrasonic horn 60 transmits the load from the mechanical press 70 and the ultrasonic waves from the vibrator 50 to the bonding tool 80.

The mechanical press 70 generates the pressure that is applied to the second bonding member 30 against the first bonding member 20 through the ultrasonic horn 60 and the bonding tool 80. Thereby, the first bonding member 20 and the second bonding member 30 are pressed against each other and the first bonding member 20 vibrates in a plane direction (the arrows X1 and X2) (as a result of the ultrasonic waves transmitted through the bonding tool 80 and applied to the second bonding member 30), and the first bonding member 20 and the second bonding member 30 are bonded together.

The bonding tool 80 transmits the ultrasonic waves transmitted from the ultrasonic horn 60 to the second bonding member 30. The bonding tool 80 vibrates in the plane direction (the arrows X1 and X2). The bonding tool 80 also applies the load from the mechanical press 70 to the second bonding member 30. The bonding tool 80 is movable in a height direction. The bonding tool 80 is brought into contact with the second bonding member 30 when bonding the first bonding member 20 and the second bonding member 30 to each other. When the bonding tool 80 is brought into contact with the second bonding member 30 and the load from the mechanical press 70 is applied, the first bonding member 20 is pressed against the second bonding member 30.

The control device 90 controls the ultrasonic oscillator 40 and the mechanical press 70. The sensor 100 is connected to the control device 90. The control device 90 changes an amplitude or time of ultrasonic waves applied to the second bonding member 30 according to a change in amplitude of the vibration of the first bonding member 20 acquired from the sensor 100. The control device 90 may have a processor 110 that determines a bonding state of the first bonding member 20 and the second bonding member 30 bonded together, which will be described below.

The sensor 100 detects a vibration state of the bonding members placed on the stage 10. For example, vibration of a bonding member placed on the lowest layer among bonding members placed on the stage 10 is detected as a vibration state. For example, information on vibration of the first bonding member 20 in a plane direction is detected. For example, the sensor 100 may be an optical sensor, a laser sensor, an eddy current displacement sensor, or the like. It is desirable to use an optical sensor or a laser sensor, which has a short response time, in order to quickly determine a bonding state during bonding, but a high-speed camera or the like may also be used depending on the type of bonding members. When an ultrasonic wave of 20 kHz is generated, the sensor 100 may have a spatial resolution of approximately one to several tenths of the amplitude and a temporal resolution of approximately one tenth of an oscillation period of the ultrasonic oscillator 40. The sensor 100 may be provided outside the ultrasonic bonding apparatus 1 separately from the ultrasonic bonding apparatus 1.

Figure 3:
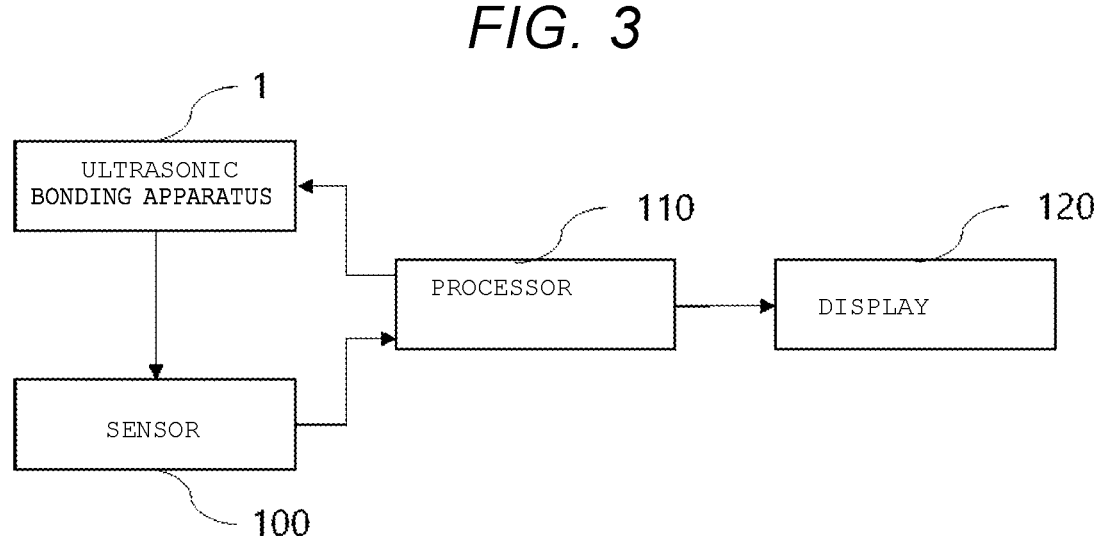
FIG. 3 is a block diagram illustrating an ultrasonic bonding system according to a first embodiment.

Subsequently, an ultrasonic bonding control system is explained. FIG. 3 is a block diagram illustrating an ultrasonic bonding control system according to a first embodiment. In addition to the ultrasonic bonding apparatus 1 illustrated in FIG. 1, the processor 110 that determines a bonding state of the first bonding member 20 and the second bonding member 30 bonded together, based on information on vibration of the first bonding member 20 in a plane direction which is acquired from the sensor 100, and a display 120 that displays a bonding state may be included.

The processor 110 collects information on an amplitude of vibration of the first bonding member 20 in the plane direction, and determines a bonding state between the first bonding member 20 and the second bonding member 30. The bonding state according to the present embodiment refers to a fracture mode of an ultrasonically bonded bonding member.

The fracture mode signifies a position that may be fractured when external force is applied to the first bonding member 20 and second bonding member 30 which are ultrasonically bonded together, for example, when a tensile test is performed. A bonding strength changes according to an amount of time an ultrasonic wave is applied and an amplitude of the ultrasonic wave, and the fracture mode changes according thereto. The fracture mode may be divided into three. The first is the peeling state. The peeling state refers to a state in which the first bonding member 20 and the second bonding member 30 are separated from each other because the bonding between the first bonding member 20 and the second bonding member 30 has not progressed enough before a tensile test is performed on the bonding member bonded together. The second is the interface fracture state. The interface fracture state refers to a state in which fracture occurs at an interface between the first bonding member 20 and the second bonding member 30 when the tensile test is performed. The third is the base member fracture state. The base member fracture state refers to a state in which fracture occurs inside a member of the first bonding member 20 or the second bonding member 30 when the tensile test is performed.

The determination according to the present embodiment refers to specifying or the like of the fracture mode that occurs, for example, when force is applied from the outside until fracture occurs in the first bonding member 20 and the second bonding member 30 that are ultrasonically bonded together, that is, when the tensile test is performed.

In addition, the processor 110 may be provided inside the ultrasonic bonding apparatus 1 or may be provided outside the ultrasonic bonding apparatus 1. For example, the processor 110 may be a computer, or any device that includes an arithmetic logic element, such as a central processing unit (CPU), and a storage element, such as a semiconductor memory.

The display 120 is, for example, a liquid crystal display that alerts by video, an LED lamp that alerts by light or color. Instead of the display 120, a speaker or siren that alerts by sound, and the like may be provided. An output from the display 120 displays a bonding state, such as the fracture mode, which is the result of determination by the processor 110, and alerts the user thereof.

Subsequently, an ultrasonic bonding method will be described. FIG. 4 is a flowchart illustrating an ultrasonic bonding method according to a first embodiment.

First, in step S100, a user sets pressure applied to the first bonding member 20 and the second bonding member 30, an amplitude of an ultrasonic wave, load, and time for applying the ultrasonic wave, to the control device 90 through a user interface or the like.

Subsequently, in step S110, the bonding tool 80 is lowered in a Z2 direction until it comes into contact with the second bonding member 30.

After the bonding tool 80 comes into contact with the second bonding member 30, the mechanical press 70 is operated in step S120 to start pressurizing the second bonding member 30 against the first bonding member 20. Pressurization of the second bonding member 30 against the first bonding member 20 is continued until reaching the load set in step S100.

Subsequently, in step S130, after reaching the load set in step S100, oscillation from the ultrasonic oscillator 40 starts. An ultrasonic wave in the plane direction is applied to the second bonding member 30 through the bonding tool 80.

In step S140, the sensor 100 starts to measure an amplitude of vibration of the first bonding member 20 in the plane direction. In the present embodiment, the sensor 100 measures the amplitude of the vibration of the first bonding member 20 in the plane direction.

In step S150, it is determined whether a first peak amplitude Ap has been determined from a graph of a relationship between the amplitude of the vibration of the first bonding member 20 in the plane direction, which is acquired from the sensor 100, and the time during which an ultrasonic wave is applied. The first peak amplitude Ap is not a value set before the ultrasonic wave is applied, but is derived from a relationship between the amplitude of the vibration of the first bonding member 20 in the plane direction and the time during which the ultrasonic wave is applied. There are situations where the first peak amplitude Ap of the vibration of the first bonding member 20 in the plane direction is determined, and also situations where the first peak amplitude Ap of the vibration of the first bonding member 20 in the plane direction is not determined.

Figure 5:
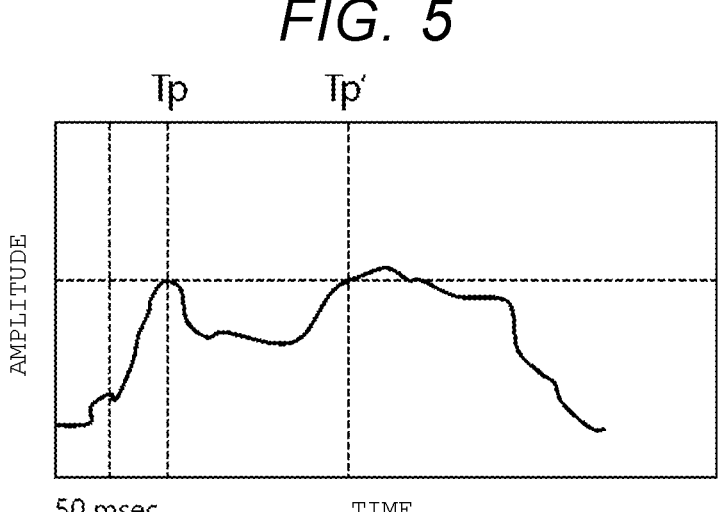
FIG. 5 is a schematic diagram illustrating an example of a relationship between an amplitude of vibration of a bonding member in a plane direction and time during which the bonding member is vibrated.

Here, a relationship between time and an amplitude in a bonding process will be described. FIG. 5 is a schematic diagram illustrating an example of a relationship between an amplitude of vibration of a bonding member in a plane direction and time during which the bonding member is vibrated. When the first bonding member 20 and the second bonding member 30 are ultrasonically bonded together, a relationship between the time during which an ultrasonic wave is applied and an amplitude of vibration of the first bonding member 20 in the plane direction has a waveform illustrated in FIG. 5. When an ultrasonic wave starts to be applied to the second bonding member 30, the amplitude of the vibration of the first bonding member 20 in the plane direction increases until time Tp. This is because an amplitude increases by transmitting vibration from the bonding tool 80 to the second bonding member 30 and the first bonding member 20. At the time Tp, the amplitude of the first bonding member 20 in the plane direction reaches a maximum value, and the amplitude of the vibration of the first bonding member 20 in the plane direction at the time Tp is defined as the first peak amplitude Ap. Meanwhile, there is a high possibility that noise occurs immediately after the start of application of an ultrasonic wave, and accordingly, the first peak amplitude Ap is set as a maximum value seen approximately 50 msec after the start of application of an ultrasonic wave. In other words, the time Tp has a value of 50 msec or more.

The amplitude of the vibration of the first bonding member 20 in the plane direction decreases after the time Tp. This is because the vibration of the first bonding member 20 in the plane direction is restrained by an anvil (not illustrated) that is placed on the stage 10 to hold the first bonding member 20. As the bonding of the first and second bonding members 20 and 30 progresses, those members 20 and 30 become to vibrate together, but its vibration is restricted by the anvil and weak.

Thereafter, the amplitude increases again. This is because the amplitude of the vibration of the first bonding member 20 in the plane direction is greatly affected by the vibration from the bonding tool 80 more than the restraint by the anvil as the bonding between the first bonding member 20 and the second bonding member 30 progresses. The amplitude increases again and reaches the first peak amplitude Ap. Specifically, as the bonding of the first bonding member 20 and the second bonding member 30 further progresses and becomes stronger, the vibration given from the bonding tool 80 to the first bonding member 20 and the second bonding member 30 can be transmitted to the first bonding member 20 without escaping to the outside, and the amplitude increases even if it is restrained by the anvil. Again, the time when reaching the first peak amplitude Ap is set to Tp'.

Thereafter, when the application of an ultrasonic wave is terminated, the amplitude gradually decreases. When the first peak amplitude Ap of the vibration of the first bonding member 20 in the plane direction is determined, it is considered that an interface between the first bonding member 20 and the second bonding member 30 is bonded as described above. In contrast, when the first peak amplitude Ap of the vibration of the first bonding member 20 in the plane direction is not determined, it is considered that the interface between the first bonding member 20 and the second bonding member 30 is not sufficiently bonded. For this reason, when the first peak amplitude Ap is determined, the processing proceeds to step S160, and when the first peak amplitude Ap is not determined, the processing is determined to be defective, a user is alerted thereof, and then the processing is terminated.

In step S160, it is checked that the amplitude of the vibration of the first bonding member 20 in the plane direction has decreased after reaching the first peak amplitude Ap. After checking that the amplitude has decreased, the processing proceeds to step S170.

In step S170, it is determined whether the amplitude of the vibration of the first bonding member 20 in the plane direction reaches the first peak amplitude Ap again. When the amplitude of the first bonding member 20 reaches the first peak amplitude Ap in step S150, decreases, and then reaches the first peak amplitude Ap again, a bonded product of the first bonding member 20 and the second bonding member 30 is determined to be not defective. For this reason, when the amplitude reaches the first peak amplitude Ap again, the processing proceeds to step S180. In contrast, when the amplitude of the first bonding member 20 reaches the first peak amplitude Ap in step S150, decreases, and then does not reach the first peak amplitude Ap again, it is determined to be defective, a user is alerted thereof, and the processing is terminated.

Subsequently, in step S180, ultrasonic oscillation from the ultrasonic oscillator 40 stops, and application of an ultrasonic wave stops. In step S180, the ultrasonic oscillation may be continued until the ultrasonic oscillation time set in step S100 elapses, or after reaching the first peak amplitude Ap again and before the time set in step S100 elapses, oscillation may stop. Subsequently, the pressure applied to the first bonding member 20 and the second bonding member 30 stops (step S190), the bonding tool 80 is moved in the Z2 direction and separated from the second bonding member 30, and the processing is terminated (step S195).

In step S150, when a maximum value is not observed within the ultrasonic wave application time set in step S100, it may be determined to be defective, a user may be alerted thereof, and then the processing may be terminated.

Figure 6:
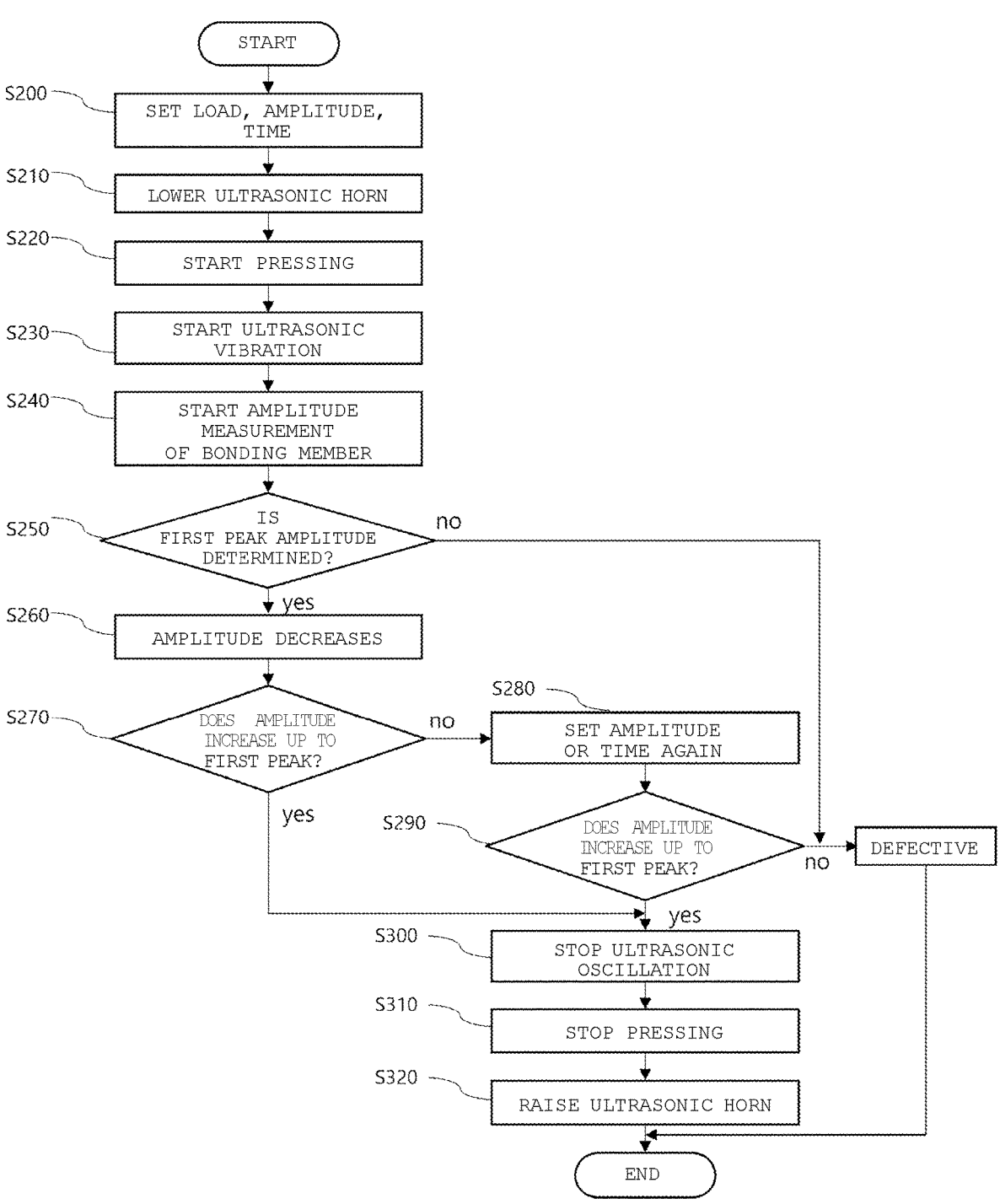
FIG. 6 is a flowchart illustrating an ultrasonic bonding method according to a second embodiment.

Next, a modification example of the ultrasonic bonding method according to the first embodiment will be described. FIG. 6 is a flowchart illustrating another ultrasonic bonding method according to a first embodiment. Step S200 to step S260 are performed in the same manner as step S100 to step S160 of the ultrasonic bonding method illustrated in FIG. 4.

In step S270, it is determined whether the vibration of the first bonding member 20 in a plane direction reaches the first peak amplitude Ap again. When an amplitude of the vibration of the first bonding member 20 in the plane direction reaches the first peak amplitude Ap again after decreasing, a bonded product of the first bonding member 20 and the second bonding member 30 is determined to be not defective. In contrast, when the amplitude of the vibration of the first bonding member 20 in the plane direction does not reach the first peak amplitude Ap again after decreasing, it is considered that the bonding at the interface between the first bonding member 20 and the second bonding member 30 is defective. For this reason, when reaching the first peak amplitude Ap again, the processing proceeds to step S300, and when not reaching the first peak amplitude Ap again, the processing proceeds to step S280.

In step S280, a user sets again an amplitude of an ultrasonic wave applied to the second bonding member 30 or application time of the ultrasonic wave to the control device 90 through the user interface or the like. After setting again the amplitude of the ultrasonic wave or the application time, the processing proceeds to step S290.

In step S290, it is determined whether the amplitude of the first bonding member 20 in the plane direction reaches the first peak amplitude Ap. When the amplitude reaches the first peak amplitude Ap, a bonded product of the first bonding member 20 and the second bonding member 30 is determined to be not defective. In contrast, when the amplitude does not reach the first peak amplitude Ap after step S280, it is determined to be defective, a user is alerted thereof, and then the processing is terminated.

Subsequently, in step S300, an electrical signal from the ultrasonic oscillator 40 stops, and the ultrasonic oscillation stops. In step S300, the ultrasonic oscillation may be continued until the ultrasonic oscillation time set in step S200 elapses, or after reaching the first peak amplitude Ap again and before the time set in step S200 elapses, oscillation may stop. Subsequently, the pressure applied to the first bonding member 20 and the second bonding member 30 stops (step S310), the bonding tool 80 is moved in the Z2 direction and separated from the second bonding member 30, and the processing is terminated (step S320).

Alternatively, in step S290, when the amplitude does not increase up to the first peak amplitude Ap, the bonded product is determined not to be defective. Instead, the processing returns to step S280, and the amplitude or time of the ultrasonic wave applied to the second bonding member 30 may be changed a second time and step S290 repeated one more time.

According to the ultrasonic bonding method of the first embodiment, whether a bonding state is defective can be determined during a bonding process, and a bonding condition can be changed according to the bonding state, and thus, a yield can be improved. In addition, even when there is no waveform of a relationship between an amplitude and time when a bonding state is good in advance, whether the bonding state is good or bad can be determined.

Second Embodiment

Next, an ultrasonic bonding method according to a second embodiment will be described with reference to FIGS. 7 to 9. The present embodiment differs from the first embodiment in a method of determining a bonding state of the first bonding member 20 and the second bonding member 30 by the processor 110. The above different points will be specifically described below.

In the first embodiment, in step S160 or step S260, when an amplitude of vibration of the first bonding member 20 in a plane direction does not decrease after reaching the first peak amplitude Ap, an interface between the first bonding member 20 and the second bonding member 30 is determined to be not sufficiently bonded, and accordingly, a bonding state is determined to be defective. Meanwhile, in the present embodiment, not only whether a bonding state is good or bad is determined but also cause of a defective bonding state or a fracture mode is determined.

Figure 7:
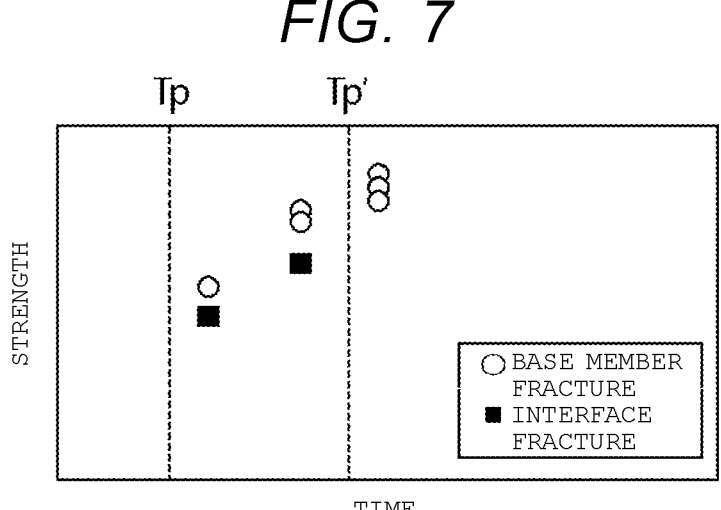
FIG. 7 is a schematic diagram illustrating an example of a relationship between ultrasonic wave application time and bonding strength, according to a first embodiment.

FIG. 7 is a schematic diagram illustrating an example of a relationship between ultrasonic wave application time and a bonding strength, according to a second embodiment. In FIG. 7, each plot shows the load applied at the time of fracture and a position of fracture when a tensile test was performed on a bonded product of the first bonding member 20 and the second bonding member 30, to which an ultrasonic wave was applied for each time. It can be seen that, in a period from time Tp to time Tp', there are two types of fracture modes of an interface fracture in which fracture occurs at an interface between the first bonding member 20 and the second bonding member 30, and a base member fracture in which the first bonding member 20 or the second bonding member 30 itself fractures. It can be seen that, after the time Tp', the interface fracture does not occur and only the base member fracture occurs. It can be said that, when the fracture mode is the base member fracture, a bonding strength at a bonding interface between bonding members is greater than a tensile strength of a base member.

Figure 8:
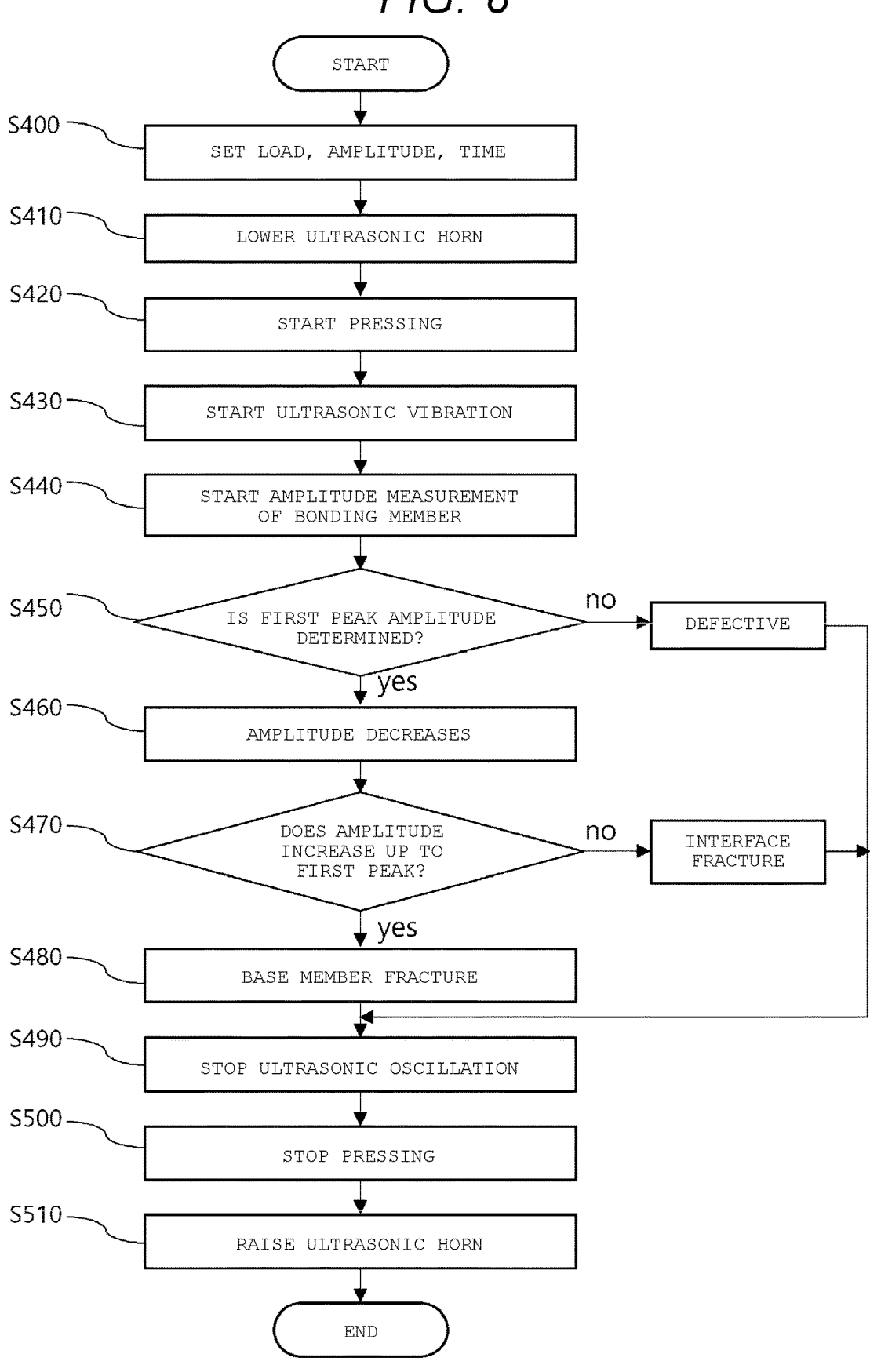
FIG. 8 is a flowchart illustrating an ultrasonic bonding method according to a second embodiment.
Figure 9:
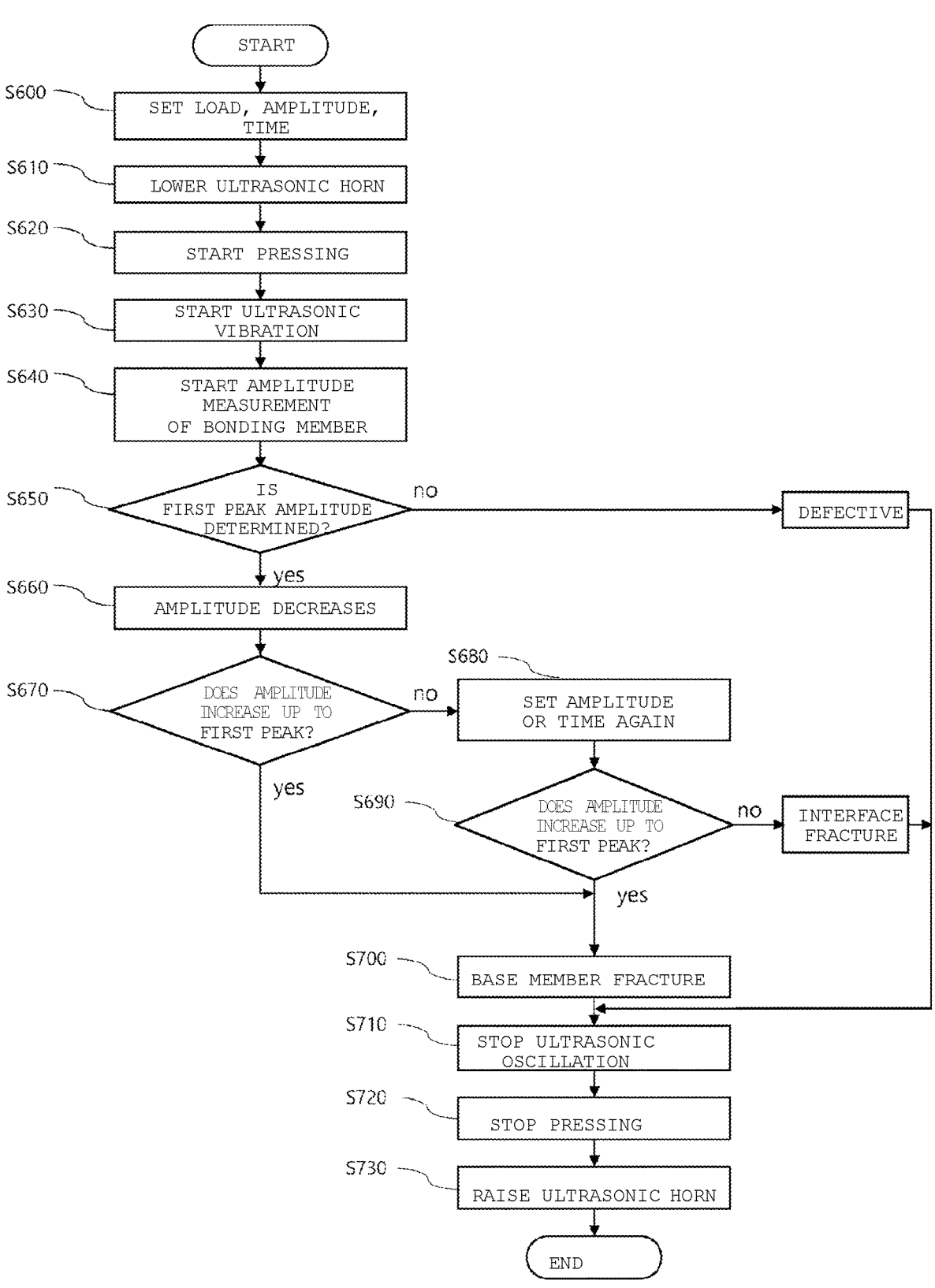
FIG. 9 is a flowchart illustrating another ultrasonic bonding method according to the second embodiment.

FIG. 8 is a flowchart illustrating an ultrasonic bonding method according to a second embodiment. Step S400 to step S440 in the present embodiment may be the same as step S100 to step S140 in the first embodiment.

In step S450, it is determined whether the first peak amplitude Ap of an amplitude of vibration of the first bonding member 20 in a plane direction is determined from a graph of a relationship between the amplitude of the vibration of the first bonding member 20 in the plane direction which is acquired from the sensor 100 and the time during which an ultrasonic wave is applied. There are situations where the first peak amplitude Ap of the vibration of the first bonding member 20 in the plane direction is determined, and situations where the first peak amplitude Ap of the vibration of the first bonding member 20 in the plane direction is not determined. When the first peak amplitude Ap of the vibration of the first bonding member 20 in the plane direction is determined, it is considered that an interface between the first bonding member 20 and the second bonding member 30 is bonded. In contrast, when the first peak amplitude Ap of the vibration of the first bonding member 20 in the plane direction is not determined, the interface between the first bonding member 20 and the second bonding member 30 is not bonded, and when the application of an ultrasonic wave stops before the amplitude decreases, there is a high possibility that the first bonding member 20 and the second bonding member 30 cannot be bonded together, that is, the first bonding member 20 and the second bonding member 30 are not much different from a state before the pressure and the ultrasonic waves are applied. For this reason, when the first peak amplitude Ap is not determined, that is, when the amplitude does not decrease after reaching the first peak amplitude Ap, it is determined that there is a high possibility that the bonding between the first bonding member 20 and the second bonding member 30 is not performed, and after a user is alerted thereof, the processing proceeds to step S490. When the first peak amplitude Ap of the vibration of the first bonding member 20 in the plane direction is determined, the processing proceeds to step S460.

In step S460, it is checked that the amplitude of the vibration of the first bonding member 20 in the plane direction decreased after reaching the first peak amplitude Ap. After checking that the amplitude decreased, the processing proceeds to step S470.

In step S470, it is determined whether the amplitude reaches the first peak amplitude Ap again. When the amplitude reaches the first peak amplitude Ap again, and when a tensile test is performed on bonding members bonded together, there is a high possibility that fracture does not occur at an interface between the first bonding member 20 and the second bonding member 30 and fracture occurs inside the first bonding member 20 or the second bonding member 30, that is, base member fracture occurs. In contrast, when the amplitude does not reach the first peak amplitude again and when a tensile test is performed on bonding members bonded together, there is a high possibility that fracture occurs at the interface between the first bonding member 20 and the second bonding member 30, that is, interface fracture occurs. For this reason, when reaching the first peak amplitude Ap, the processing proceeds to step S480, and when not reaching the first peak amplitude Ap, it is determined that there is a high possibility that the interface fracture occurs at the interface between the first bonding member 20 and the second bonding member 30, and after a user is alerted thereof, the processing proceeds to step S490.

In step S480, a bonding strength at a bonding interface between the first bonding member 20 and the second bonding member 30 is greater than a strength of the first bonding member 20 or the second bonding member 30 based on the determination made in step S470, that is, a user is alerted of base member fracture, and the processing proceeds to step S490.

Step S490 to step S510 may be performed in the same manner as step S180 to step S200 in the first embodiment.

In the flowchart illustrated in FIG. 8, after alerting a user of the base member fracture in step S480, ultrasonic oscillation and pressurization stop, but the step of alerting of the base member fracture may be performed after bonding is terminated.

Next, a modification example of the ultrasonic bonding method according to the second embodiment will be described. FIG. 9 is a flowchart illustrating another ultrasonic bonding method according to a second embodiment. Step S600 to step S660 may be performed in the same manner as step S400 to step S460 of the ultrasonic bonding method illustrated in FIG. 8.

In step S670, it is determined whether an amplitude of vibration of the first bonding member 20 in a plane direction reaches the first peak amplitude Ap again. When the amplitude of the vibration of the first bonding member 20 in the plane direction reaches the first peak amplitude Ap again, and when a tensile test is performed on bonding member bonded together, there is a high possibility that fracture does not occur at an interface between the first bonding member 20 and the second bonding member 30 and fracture occurs inside the first bonding member 20 or the second bonding member 30, that is, base member fracture occurs. In contrast, when the amplitude does not reach the first peak amplitude again and when a tensile test is performed, there is a high possibility that fracture occurs at the interface between the first bonding member 20 and the second bonding member 30, that is, interface fracture occurs. For this reason, when reaching the first peak amplitude Ap, the processing proceeds to step S700, and when not reaching the first peak amplitude Ap, the processing proceeds to step S680.

In step S680, a user sets again an amplitude of an ultrasonic wave applied to the second bonding member 30 or time for applying the ultrasonic wave to the control device 90 through the user interface or the like. After the amplitude of the ultrasonic wave or the application time is set again, the processing proceeds to step S690.

In step S690, it is determined whether the amplitude of the first bonding member 20 in the plane direction reaches the first peak amplitude Ap. When the amplitude of the first bonding member 20 in the plane direction reaches the first peak amplitude Ap, it is considered to be highly likely that base member fracture occurs in the first bonding member 20 and the second bonding member 30. In contrast, when the amplitude of the first bonding member 20 in the plane direction does not reach the first peak amplitude Ap, it is considered to be highly likely that interface fracture occurs in the first bonding member 20 and the second bonding member 30. For this reason, when the amplitude of the first bonding member 20 in the plane direction reaches the first peak amplitude Ap, the processing proceeds to step S700, and when the amplitude of the first bonding member 20 in the plane direction does not reach the first peak amplitude Ap and when a tensile test is performed, there is a high possibility that fracture occurs at an interface between the first bonding member 20 and the second bonding member 30, that is, interface fracture occurs, and accordingly, it is determined that there is a high possibility that interface fracture occurs in the first bonding member 20 and the second bonding member 30, and after a user is alerted thereof, the processing proceeds to step S710.

In step S700, a bonding strength at a bonding interface between the first bonding member 20 and the second bonding member 30 is greater than a strength of the first bonding member 20 or the second bonding member 30 based on the determination made in step S690, that is, a user is alerted of base member fracture, and the processing proceeds to step S710.

In step S710, an electrical signal from the ultrasonic oscillator 40 stops and the ultrasonic oscillation stops. In step S710, the ultrasonic oscillation may be continued until the ultrasonic oscillation time set in step S600 elapses, or after reaching the first peak amplitude Ap again and before the time set in step S600 elapses, oscillation may stop. Subsequently, the pressure applied to the first bonding member 20 and the second bonding member 30 stops (step S720), the bonding tool 80 is moved in the Z2 direction and separated from the second bonding member 30, and the processing is terminated (step S730).

After it is determined in step S660 that there is a high possibility that the bonding between the first bonding member 20 and the second bonding member 30 is not performed, the processing proceeds to step S680 without proceeding to step S710, and an amplitude of the applied ultrasonic wave or time may be changed again.

According to the ultrasonic bonding method of the second embodiment, in addition to determining whether a bonding state is good or bad during a bonding process of bonding members, the degree of bonding can be checked when the bonding state is insufficient. Therefore, a fracture mode of all bonding members bonded together can be checked, and more accurate quality control can be performed compared to specifying the fracture mode by a tensile test of any bonding member.

Furthermore, since bonding time and an amplitude may be randomly changed according to a required bonding state from a waveform acquired from the sensor 100, bonding can be performed efficiently.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An ultrasonic bonding process comprising:
pressurizing a first bonding member against a second bonding member in a first direction for a period of time;
while pressurizing the first bonding member against the second bonding member in the first direction during the period of time, applying ultrasonic waves to the second bonding member to cause vibration in the first bonding member in a second direction perpendicular to the first direction;
determining a state of the vibration of the first bonding member in the second direction during the applying of the ultrasonic waves to the second bonding member; and
determining a bonding state of the first bonding member and the second bonding member based on the determined state of the vibration.

2. The ultrasonic bonding process according to claim 1, further comprising:
pressurizing the first bonding member against the second bonding member for an additional period of time; and
while pressurizing the first bonding member against the second bonding member during the additional period of time, applying ultrasonic waves to the second bonding member based on the bonding state.

3. The ultrasonic bonding process according to claim 1, wherein
the bonding state is determined to be not defective if a peak is observed in the amplitude of the vibration in the second direction.

4. The ultrasonic bonding process according to claim 1, further comprising:
while pressurizing the first bonding member against the second bonding member, and applying the ultrasonic waves to cause the vibration in the first bonding member during the period of time, applying an external force to the first bonding member and the second bonding member; and
determining a position of possible fracture based on the amplitude of the vibration.

5. The ultrasonic bonding process according to claim 4, wherein
the position of the possible fracture is determined to be inside or at an interface between the first bonding member and the second bonding member if the amplitude of the vibration has two peaks in the second direction.

6. An ultrasonic bonding apparatus comprising:
a mechanical press configured to press a first bonding member against a second bonding member in a first direction;
an ultrasonic wave generator configured to apply ultrasonic waves to the second bonding member in a second direction perpendicular to the first direction;
a sensor configured to detect a state of vibration of the first bonding member in the second direction; and
a processor configured to determine a bonding state between the first bonding member and the second bonding member based on the detected state of the vibration.

7. The ultrasonic bonding apparatus according to claim 6, further comprising:
a control device configured to control the mechanical press and the ultrasonic wave generator based on control signals from the processor.

8. The ultrasonic bonding apparatus according to claim 7, wherein
the ultrasonic wave generator includes an ultrasonic horn transmitting the ultrasonic waves to the second bonding member, and
the processor determines that the bonding state is not defective if a peak is observed in the amplitude of the vibration in the first bonding member in the second direction.

9. The ultrasonic bonding apparatus according to claim 7, wherein
the processor is configured to cause the control device to stop the mechanical press or the ultrasonic wave generator after the amplitude of the vibration in the second direction reaches a peak amplitude and then decreases.

10. The ultrasonic bonding apparatus according to claim 7, wherein
the sensor is an optical sensor, a laser sensor, or an eddy current displacement sensor.

11. An ultrasonic bonding system comprising:

a mechanical press configured to press a first bonding member against a second bonding member in a first direction;

an ultrasonic wave generator configured to apply ultrasonic waves to the second bonding member in a second direction perpendicular to the first direction;

a sensor configured to detect a state of vibration of the first bonding member in the second direction; and a control device configured to control the mechanical press and the ultrasonic wave generator to carry out a process including:

pressurizing the first bonding member against the second bonding member in the first direction;

while pressurizing the first bonding member against the second bonding member in the first direction for a period of time, applying ultrasonic waves to the second bonding member to cause vibration in the first bonding member in a second direction perpendicular to the first direction; and determining a bonding state of the first bonding member and the second bonding member based on the state of the vibration detected by the sensor during the applying of the ultrasonic waves to the second bonding member.

12. The ultrasonic bonding system according to claim 11, wherein the process further includes:

pressurizing the first bonding member against the second bonding member for an additional period of time; and while pressurizing the first bonding member against the second bonding member during the additional period of time, applying ultrasonic waves to the second bonding member based on the bonding state.

13. The ultrasonic bonding system according to claim 11, wherein the bonding state is determined to be not defective if a peak is observed in the amplitude of the vibration in the second direction.

14. The ultrasonic bonding system according to claim 11, wherein the process further includes:

while pressurizing the first bonding member against the second bonding member, and applying the ultrasonic waves to cause the vibration in the first bonding member during the period of time, applying an external force to the first bonding member and the second bonding member; and determining a position of possible fracture based on the amplitude of the vibration.

15. The ultrasonic bonding system according to claim 14, wherein the position of the possible fracture is determined to be inside or at an interface between the first bonding member and the second bonding member if the amplitude of the vibration has two peaks in the second direction.

* * * * *